US010868995B2

(12) United States Patent
Ushinaga

(10) Patent No.: US 10,868,995 B2
(45) Date of Patent: Dec. 15, 2020

(54) AD CONVERTER AND SOLID-STATE IMAGING DEVICE

(71) Applicant: SHARP KABUSHIKI KAISHA, Sakai (JP)

(72) Inventor: Takeo Ushinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 4 days.

(21) Appl. No.: 16/131,257

(22) Filed: Sep. 14, 2018

(65) Prior Publication Data

US 2019/0082134 A1 Mar. 14, 2019

(30) Foreign Application Priority Data

Sep. 14, 2017 (JP) .................. 2017-177075

(51) Int. Cl.
*H04N 5/378* (2011.01)
*H04N 5/376* (2011.01)
*H04N 5/357* (2011.01)

(52) U.S. Cl.
CPC ........... *H04N 5/378* (2013.01); *H04N 5/3575* (2013.01); *H04N 5/3765* (2013.01)

(58) Field of Classification Search
CPC ..... H04N 5/378; H04N 5/3575; H04N 5/3765
USPC ........................................................ 348/294
See application file for complete search history.

(56) References Cited

U.S. PATENT DOCUMENTS

| | | | |
|---|---|---|---|
| 2007/0046795 A1* | 3/2007 | Yamashita | H03M 1/123 348/294 |
| 2009/0026352 A1* | 1/2009 | Shimomura | H04N 5/378 250/214 R |
| 2010/0253821 A1* | 10/2010 | Yamamoto | H03K 4/02 348/294 |
| 2011/0013046 A1* | 1/2011 | Hiyama | H03M 1/06 348/222.1 |
| 2012/0249850 A1* | 10/2012 | Hagihara | H03M 1/14 348/302 |
| 2013/0015329 A1 | 1/2013 | Iwaki | |
| 2015/0181145 A1* | 6/2015 | Lee | H04N 5/378 250/208.1 |
| 2015/0249797 A1* | 9/2015 | Yui | H04N 5/3575 250/208.1 |
| 2016/0011889 A1* | 1/2016 | Thach | G06F 9/45516 703/22 |

FOREIGN PATENT DOCUMENTS

JP 2011-234326 A 11/2011

\* cited by examiner

*Primary Examiner* — Sinh Tran
*Assistant Examiner* — Zhenzhen Wu
(74) *Attorney, Agent, or Firm* — ScienBiziP, P.C.

(57) ABSTRACT

An AD converter includes a comparator that compares a potential of a pixel signal line with a reference potential that is a potential of a ramp waveform changing with time, a counter that stops a counting operation in response to a change in an output of the comparator, and an all-bit latch unit that holds all bits of a count value subsequent to stopping the counting operation during the second count period. The counter sets an initial value for the counting operation during the first count period to be a negative value, and prior to the counting operation during the second count period, inverts all bits of the count value subsequent to stopping the counting operation during the first count period.

14 Claims, 17 Drawing Sheets

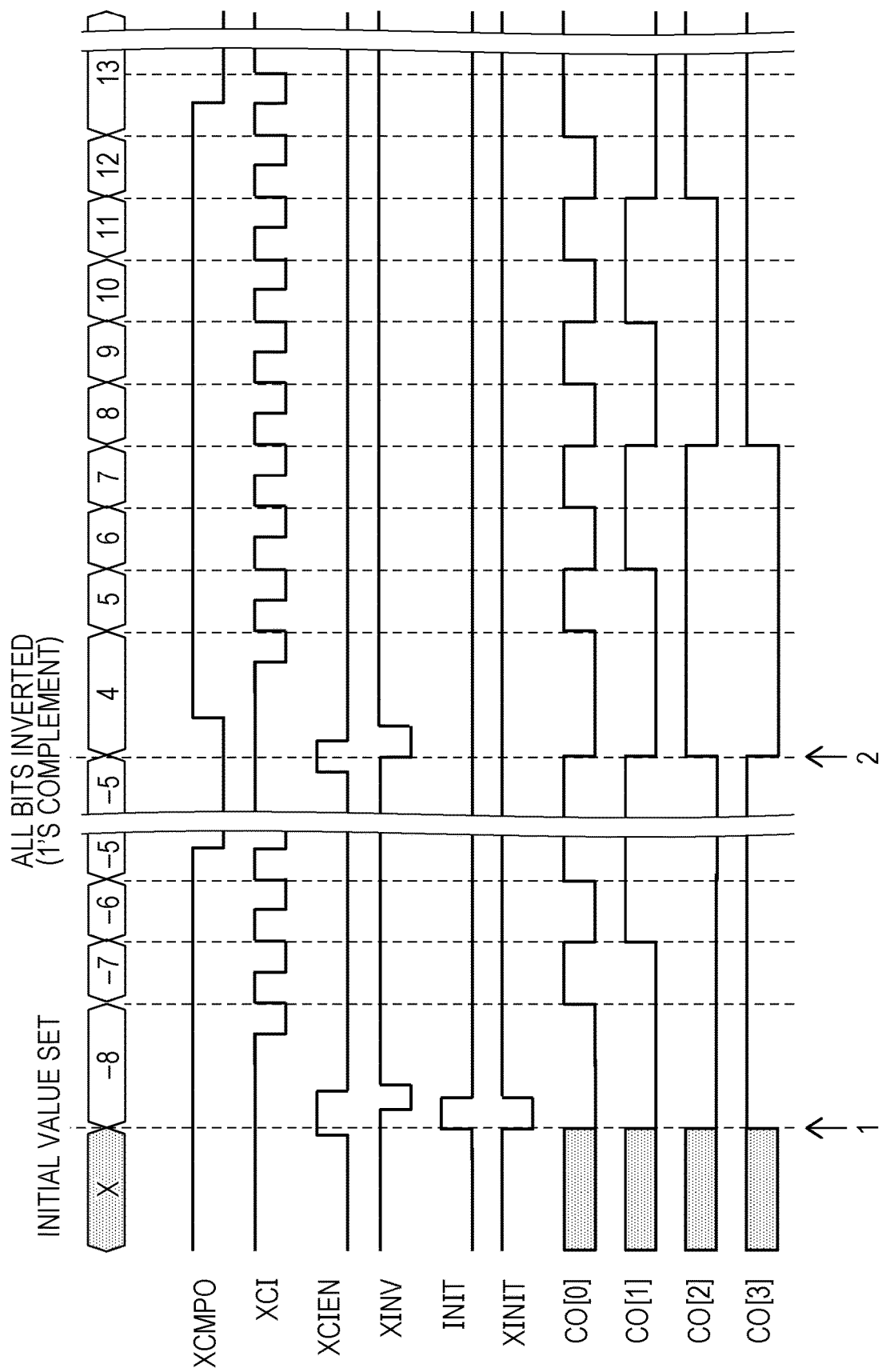

AD CONVERTER AND SOLID-STATE IMAGING DEVICE

BACKGROUND

1. Field

The present disclosure relates to an analog-to-digital (AD) converter and a solid-state imaging device.

2. Description of the Related Art

Japanese Unexamined Patent Application Publication No. 2011-234326 discloses an AD conversion technique. In the disclosed technique, an AD conversion is performed by performing a first counting operation on a pixel reset potential, and a second counting operation on a pixel signal potential, and determining a difference between the result of the first counting operation and the result of the second counting operation.

Referring to FIGS. 14A and 14B, the initial value of the first counting operation is set to be zero, and a counter that performs the first counting operation using down counting, and the second counting operation using up counting may be typically used. This counter is referred to an up-down counter. Another counter that performs the first counting operation using up counting, and the second counting operation using up counting may also be typically used. This counter is referred to as an up-up counter.

Referring to FIGS. 14A and 14B, regardless of whether the up-down counter or the up-up counter is used, the output may take a negative value. If an AD conversion is performed at an accuracy level of N bits with the initial value for the first counting operation set to zero, an (N+1)-bit counter is used with 1 bit added for sign. This leads to circuit expansion and cost increase.

SUMMARY

It is desirable to perform an AD conversion without using a bit for sign.

According to an aspect of the disclosure, there is provided an AD converter. The AD converter converts a potential of a pixel signal line into a digital signal during each of a first count period and a second counter period in succession to the first count period. The AD converter includes a comparator that compares the potential of the pixel signal line with a reference potential that is a potential of a ramp waveform changing with time, a counter that stops a counting operation in response to a change in an output of the comparator, and as all-bit latch unit that holds all bits of a count value subsequent to stopping the counting operation during the second count period. The counter sets an initial value for the counting operation during the first count period to be a negative value, and prior to the counting operation during the second count period, inverts all bits of the count value subsequent to stopping the counting operation during the first count period.

BRIEF DESCRIPTION OF THE DRAWINGS

FIG. 7A and FIG. 7B illustrate a driving operation example of a 4-bit counter;

DESCRIPTION OF THE EMBODIMENTS

First Embodiment

Embodiments of the disclosure are described in detail below with reference to FIG. 1 through. FIG. 10B.

Configuration of Solid-State Imaging Device

Figure 1:
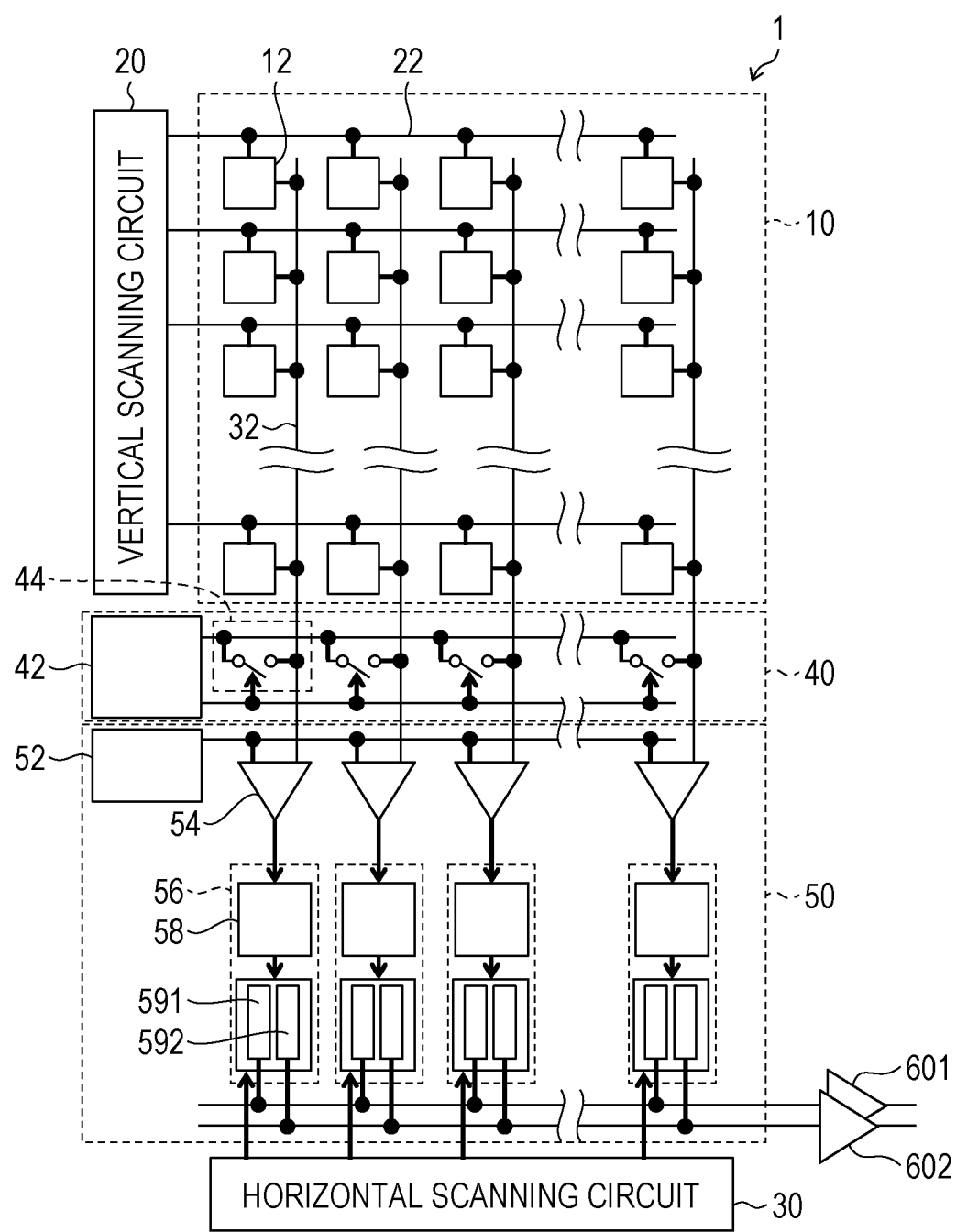
FIG. 1 is a block diagram illustrating the configuration of a solid-state imaging device of a first embodiment of the disclosure.

FIG. 1 is a block diagram illustrating the configuration of a solid-state imaging device 1 of a first embodiment of the disclosure.

The solid-state imaging device 1 of the first embodiment includes a pixel unit 10, a vertical scanning circuit 20, a horizontal scanning circuit 30, a clamp circuit 40, and an analog-to-digital (AD) converter 50.

The pixel unit 10 includes row and columns of pixels 12 that perform photoelectric conversion. The pixels 12 arranged in the same row direction are connected to the same wiring line 22, and thus connected to the vertical scanning circuit 20 to be controlled. The pixels 12 arranged in the same column direction are connected to the same pixel signal line 32. The pixel 12 photoelectrically converts incident light into an analog signal. The analog signal is transferred to the AD converter 50 via the pixel signal line 32. The AD converter 50 AD-converts the analog signal on a per column basis. The horizontal scanning circuit 30 successively selects and reads AD-converted values that are held by a first latch unit 591 and a second latch unit 592. The horizontal scanning circuit 30 outputs read results to a first sensor amplifier 601 and a second sensor amplifier 602. The pixel 12 may have a typical configuration, such as a three-transistor configuration, a four-transistor configuration, or a global shutter configuration.

Figure 2:
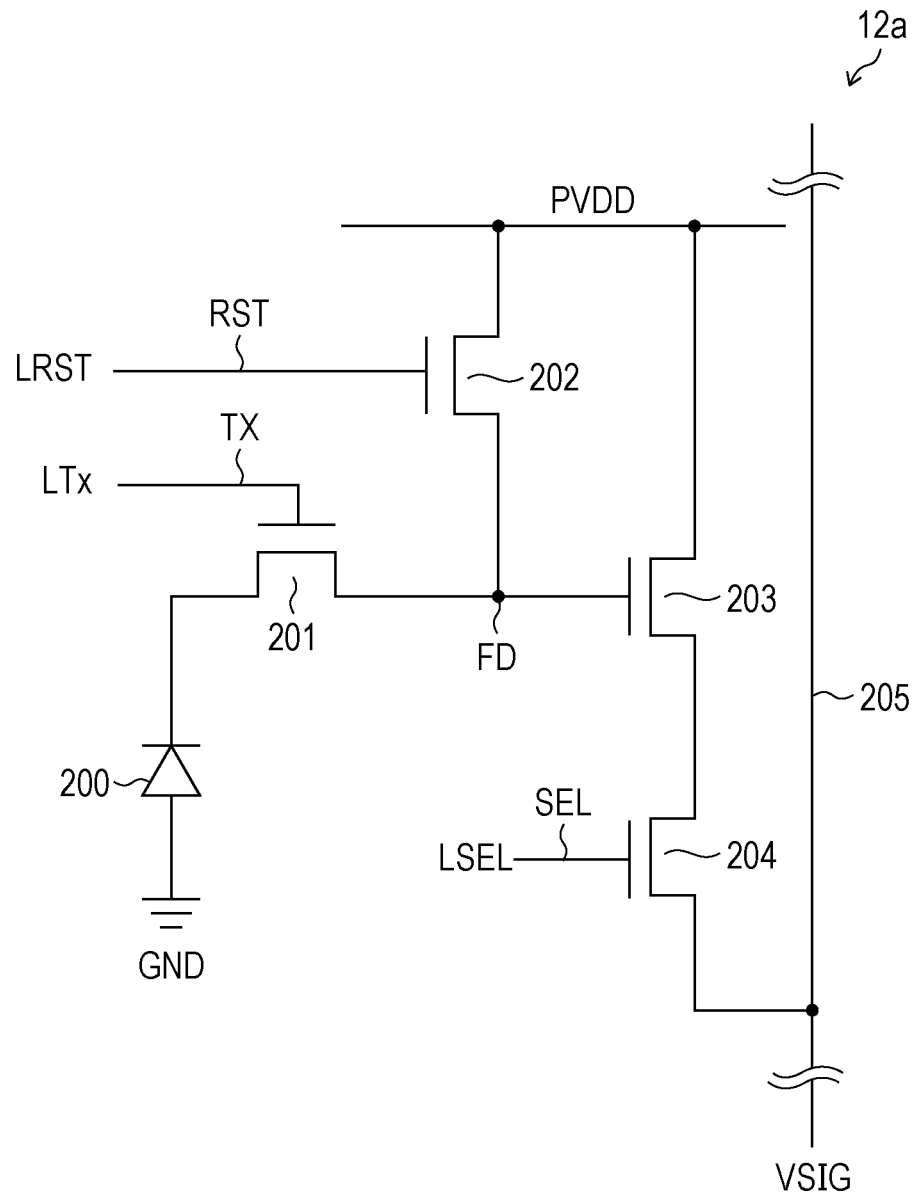
FIG. 2 illustrates a four-transistor configuration that is a typical example of an pixel.

The four-transistor configuration as a typical pixel configuration is described with reference to FIG. 2. A pixel 12a is a unit pixel of a complementary metal-oxide semiconductor (CMOS) image sensor including four transistors.

The pixel 12a includes a photodiode 200 as a photoelectric conversion device.

The pixel 12a includes the photodiode 200 and four active elements working with the photodiode 200, including a transfer transistor 201 serving as a transfer element, a reset transistor 202 serving as a reset element, an amplifier transistor 203, and a selecting transistor 204.

The photodiode 200 photoelectrically converts incident light into an amount of charge (electrons herein) responsive to an intensity of the incident light.

The transfer transistor 201 is connected between the photodiode 200 and a floating diffusion point (FD) serving as an output node.

The transfer transistor 201 receive at the gate thereof (transfer gate) a driving signal TX via a transfer control line LTx, and transfers, to the FD, electrons which the photodiode 200 serving as a photoelectric conversion device converts the incident light into.

The reset transistor 202 is connected to a power source line PVDD and the FD.

When the reset transistor 202 receives at the gate thereof a reset RST via a reset control line LRST, the reset transistor 202 resets the potential at the floating diffusion point FD to the potential of the power source line PVDD.

The gate of the amplifier transistor 203 is connected to the floating diffusion point FD. The amplifier transistor 203 is connected to a pixel signal line 205 via the selecting transistor 204, and forms a source follower together with a constant current source outside the pixel.

A control signal (an address signal or a select signal) SEL is applied to the gate of the selecting transistor 204 via a selection control line LSEL, thereby turning the selecting transistor 204 on.

When the selecting transistor 204 is turned on, the amplifier transistor 203 amplifies the potential at the floating diffusion point FD, and outputs the voltage responsive to the potential to the pixel signal line 205. The voltage output from each pixel via the pixel signal line 205 is output to a column AD converter (ADC) serving as a pixel signal reading unit.

The operations described above are concurrently performed in parallel on the pixels arranged on one row because the gates of the transfer transistor 201, the reset transistor 202, and the selecting transistor 204 are connected on a per row basis.

The reset control line LRST, the transfer control line LTx, and the selection control line LSEL are wired as a set to the pixel 12a, and the set is wired to a pixel array on a per row basis.

The vertical scanning circuit 20 drives the reset control line LRST, the transfer control line LTx, and the selection control line LSEL working as a pixel drive unit.

A clamp unit 40 clamps the potential of the pixel signal line 32 to higher than a predetermined value during an auto-zero period of a comparator 54. The auto-zero period of the comparator 54 is a period throughout which the input and the output of the comparator 54 are shorted to each other such that the offset of the comparator 54 is canceled. By clamping the pixel signal line during the auto-zero period of the comparator 54, the potential of the pixel signal line 32 is set free from a potential drop caused by the reception of high-intensity light during a first AD conversion period (discussed below).

Figure 3:
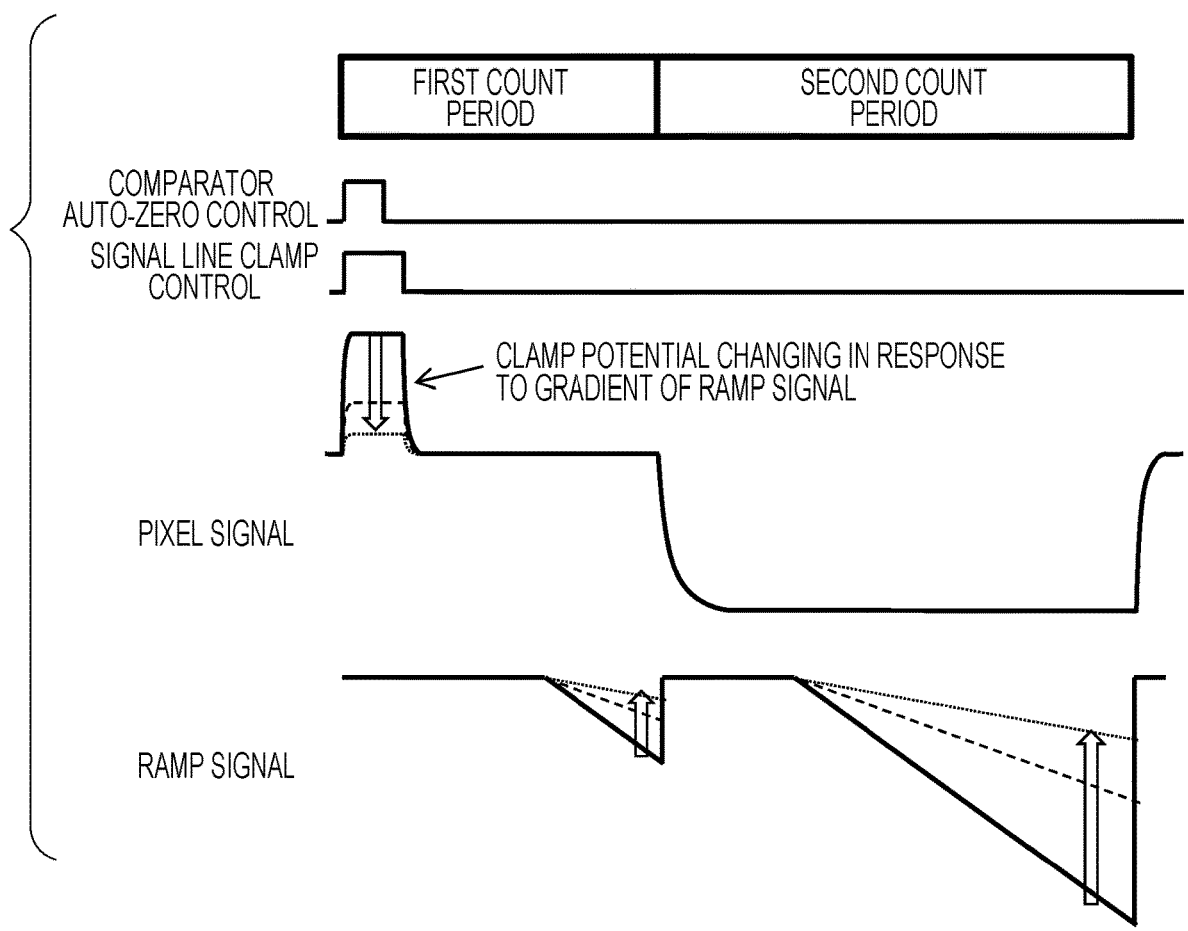
FIG. 3 illustrates a control operation example of a clamp potential.

The clamp unit 40 includes a clamp voltage generator 42, and a switch unit 44 that is arranged for each pixel column. The switch unit 44 causes the clamp voltage generator 42 to connect to the pixel signal line 32 during the auto-zero period of the comparator 54 or during periods prior to and subsequent to the auto-zero period of the comparator 54, and causes the clamp voltage generator 42 to remain unconnected during other periods of time. The clamp voltage generator 42 generates the clamp potential of the clamp unit 40 that is higher than a pixel reset potential and lower than a power source voltage of the pixel unit 10. Referring to FIG. 3, this is intended to change a reference potential of a ramp waveform from a higher potential to a lower potential. The pixel reset potential indicates a potential that is AD-converted during a first AD conversion period as described below.

The clamp potential serves as a reference potential in the AD conversion. A difference between the potential of the pixel signal line 32 and the clamp potential is AD-converted during each of the first AD conversion period and second AD conversion period. For this reason, the count results of the first AD conversion period and the count results of the second AD conversion period contain an offset value.

Referring to FIG. 3, the clamp voltage generator 42 changes the clamp potential of the clamp unit 40 in response to the gradient of the ramp waveform. For example, the gradient of the ramp signal may decrease with the clamp potential not changed, and a potential difference between the clamp potential and the potential of the pixel signal may be AD-converted. In such a case, the determination time of the comparator increases. An offset value in the count results thus increases. For this reason, the clamp potential is adjusted in response to the gradient of the ramp signal. The offset value in the count results thus remains fixed. This controls an excessive increase in the offset value in the count results that leads to a fault determination as to whether high-intensity light has been received. The clamp voltage generator 42 changes the clamp potential of the clamp unit 40 such that the potential difference between the clamp potential and the pixel reset potential is proportional to the gradient of the ramp waveform. Since the offset value in the count results relates to the clamp potential, the offset value in the count results may be changed in response to the potential difference between the pixel reset potential and the clamp potential.

The AD converter 50 converts the potential of the pixel signal line 32 into a digital signal during a first count period and a second count period subsequent to the first count period. The AD converter 50 includes a ramp generator 52, and on each pixel column, the comparator 54 and a counter and latch unit 56. The counter and latch unit 56 includes a counter 58, a first latch unit 591, and a second latch unit 592.

The ramp generator 52 generates a ramp waveform that changes with time.

The comparator 54 compares the potential of the pixel signal line 32 with the reference potential of the ramp waveform.

The counter 58 starts a counting operation in response to a change in the reference potential. Alternatively, the counter 58 may start prior to the start of the change in the reference potential or subsequent to the end of the change in the reference potential. The counter 58 may stop the counting operation in response to a change in the output of the comparator 54. More specifically, the counter 58 stops the counting operation by performing control such that a clock signal XCI does not change.

During the first count period, the counter 58 performs the counting operation until the count value reaches a first predetermined value, and during the second count period, the counter 58 performs the counting operation until the count value reaches a second predetermined value.

In other words, the counter 58 may perform the counting operation until the first predetermined value, and is not able to perform the counting operation beyond the first predetermined value. Similarly, the counter 58 may perform the counting operation until the second predetermined value, and is not able to perform the counting operation beyond the second predetermined value. If no change occurs in the output of the comparator 54 even at the first predetermined value, the counter 58 stops the counting operation. Similarly, if no change occurs in the output of the comparator 54 even at the second predetermined value, the counter 58 stops the counting operation. In this way, if a fault occurs causing no output from the comparator 54, the counter 58 may stop the counting operation. The first predetermined value may be a maximum value Drmax during the first AD conversion period. The second predetermined value may be a maximum value Dsmax during the second AD conversion period.

The period of time from the start to the stop of the counting operation of the counter 58 during the first count period is referred to as the first AD conversion period. The period of time from the start to the stop of the counting operation of the counter 58 during the second count period is referred to as the second AD conversion period.

The first latch unit 591 is a most-significant bit latch unit that holds the most significant bit of the count value of the counter 58 subsequent to the stop of the counting operation during the first count period. Each first latch unit 591 on each pixel column is connected to the first sensor amplifier 601.

The second latch unit 592 is an all-bit latch unit that holds all bits of the count value subsequent to the stop of the counting operation during the second count period. Each second latch unit 592 on each pixel column is connected to the second sensor amplifier 602.

Configuration of Counter and Latch Unit

Figure 4:
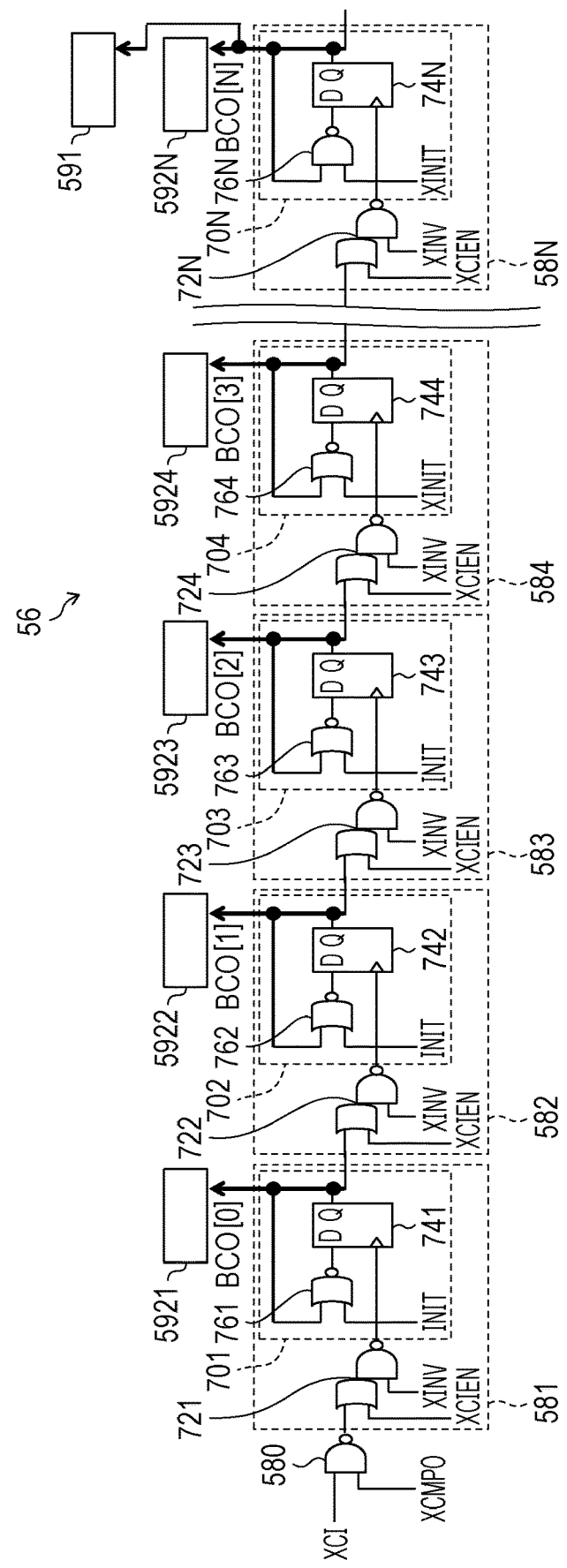
FIG. 4 illustrates a configuration of a counter and latch unit of the solid-state imaging device of the first embodiment of the disclosure.

FIG. 4 illustrates the configuration of the counter and latch unit 56.

The counter and latch unit 56 includes a NAND gate 580, one-bit counters 581, 582, 583, 584, . . . , 58N, first latch unit 591, second latch units 5921, 5922, 5923, 5924, . . . , 592N.

The NAND gate 580 receives the clock signal XCI and an output signal XCMPO of the comparator 54.

Each of the one-bit counters 581, 582, 583, 584, . . . , 58N is a ripple counter. The ripple counters include a toggle ripple flipflop (TFF-IL) that gives a low output when it is reset, and a toggle ripple flipflop (TFF-IH) that gives a high output when it is reset. In accordance with the embodiment, the TFFs 701, 702, 703, and 704 respectively contained in the one-bit counters 581, 582, 583, and 584 are TFF-ILs. TFF 70N contained in the one-bit counter 58N is TFF-IH.

The combination of the ripple counters TFF-ILs and TFF-IH illustrated in FIG. 4 is illustrated for exemplary purposes only, and any other combination is acceptable.

Configuration of Ripple Counter

Figure 5A:
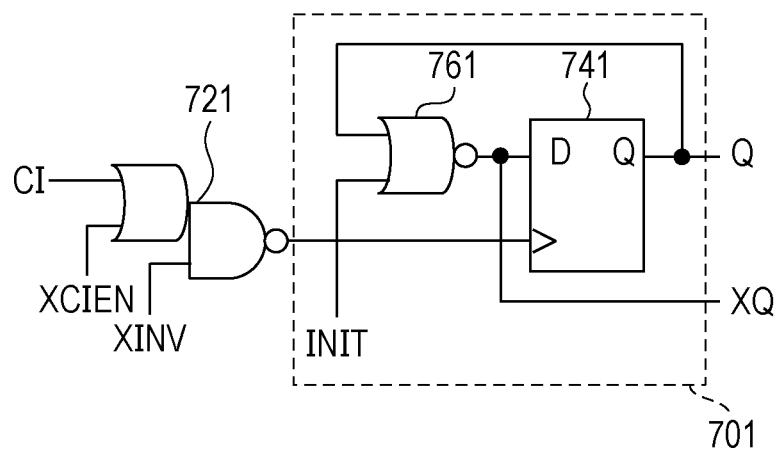
FIG. 5A and FIG. 5B illustrate a toggle flipflop (TFF) included is the solid-state imaging device in accordance with the first embodiment of the disclosure.

FIG. 5A illustrates the configuration of the one-bit counter 581 including TFF-IL. The one-bit counter 581 includes TFF 701 and a composite (OR-NAND) gate 721.

The TFF 701 includes D-flipflop (DFF) 741, and a NOR gate 761. The NOR gate 761 is connected to the input of the DFF 741. The output of the DFF 741 and an initialization signal INIT are respectively connected to the inputs of the NOR gate 761.

The composite gate 721 includes an OR gate and a NAND gate. The OR gate receives the clock signal XCI and a signal XCIEN. The signal XCIEN holds a count value, and blocks the clock input to the TFF. The NAND gate receives the output of the OR gate, and a signal XINV. The output of the composite gate 721 is input to the DFF 741. The signal XINV inverts the count value.

Figure 5B:
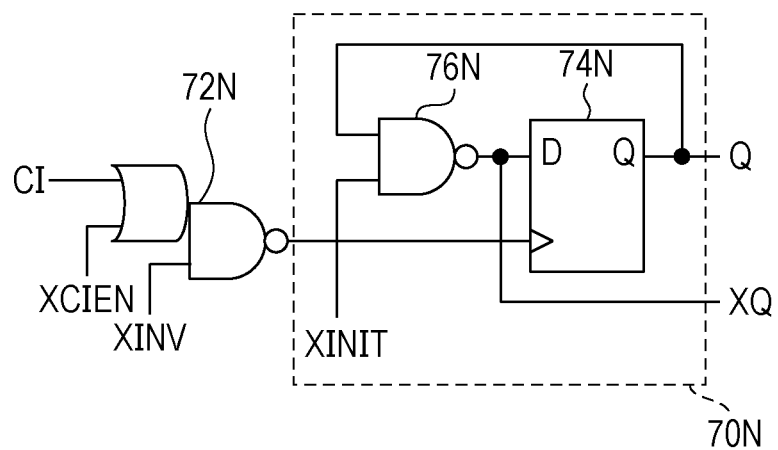

FIG. 5B illustrates the one-bit counter 58N including a TFF-IH. The one-bit counter 58N includes a TFF 70N and a composite gate 72N.

The TFF 70N includes a DFF 74N and a NAND gate 76N. The NAND gate 76N is connected to the input of the DFF 74N. The output of the DFF 74N and the initialization signal INIT are connected to the inputs of the NAND gate 76N.

The composite gate 72N includes an OR gate and a NAND gate. The OR gate receives the clock signal XCI and the signal XCIEN. The NAND gate receives the output of the OR gate, and the signal XINV. The output of the composite gate 72N is input to the DFF 74N.

Referring to FIG. 4, the outputs of NOR gates 761, 762, 763, and 764 are respectively connected to the second latch units 7921, 7922, 7923, and 7924. The output of the NAND gate 76N is connected to the second latch unit 792N. More specifically, the second latch unit 792 is connected to all the one-bit counters 581, 582, 583, 584, . . . , 58N.

The output of the NAND gate 76N is also connected to the first latch unit 791. More specifically, the first latch unit 791 is connected to the most-significant one-bit counter 58N.

Driving Example of Counter

Figure 6:
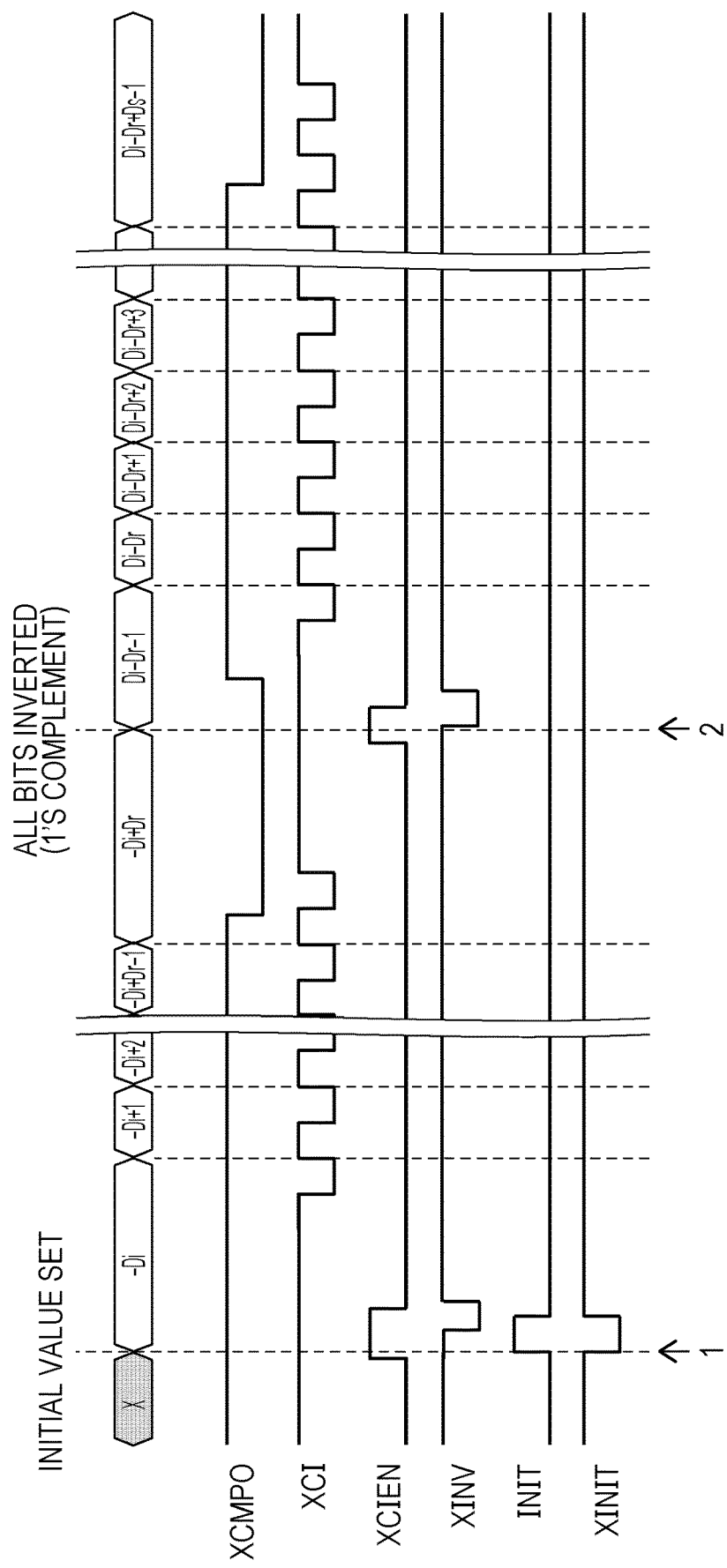
FIG. 6 illustrates a driving operation example of a counter of the solid-state imaging device of the first embodiment of the disclosure.

FIG. 6 illustrates each signal changing with time.

At a timing indicated by an arrow mark 1, the counter 58 sets the initial value of the counting operation during the first count period to be a negative value. In accordance with the embodiment, the count value is set to be an initial value of −Di. In response to the clock signal XCI transitioned to a high level, the count value increments by 1. After the first count value is entered with the output signal XCMPO of the comparator 54 transitioned to a low level, all bits of the count value are inverted to be 1's complement at a timing indicated an arrow mark 2. More specifically, prior to the start of the counting operation during the second count period, the counter 58 inverts the count value subsequent to the end of the counting operation during the first count period, thereby converting the count value to 1's complements. The 1's complements are thus set to be an initial value of the counting operation during the second count period.

Driving Example of 4-Bit Counter

Figure 7A:
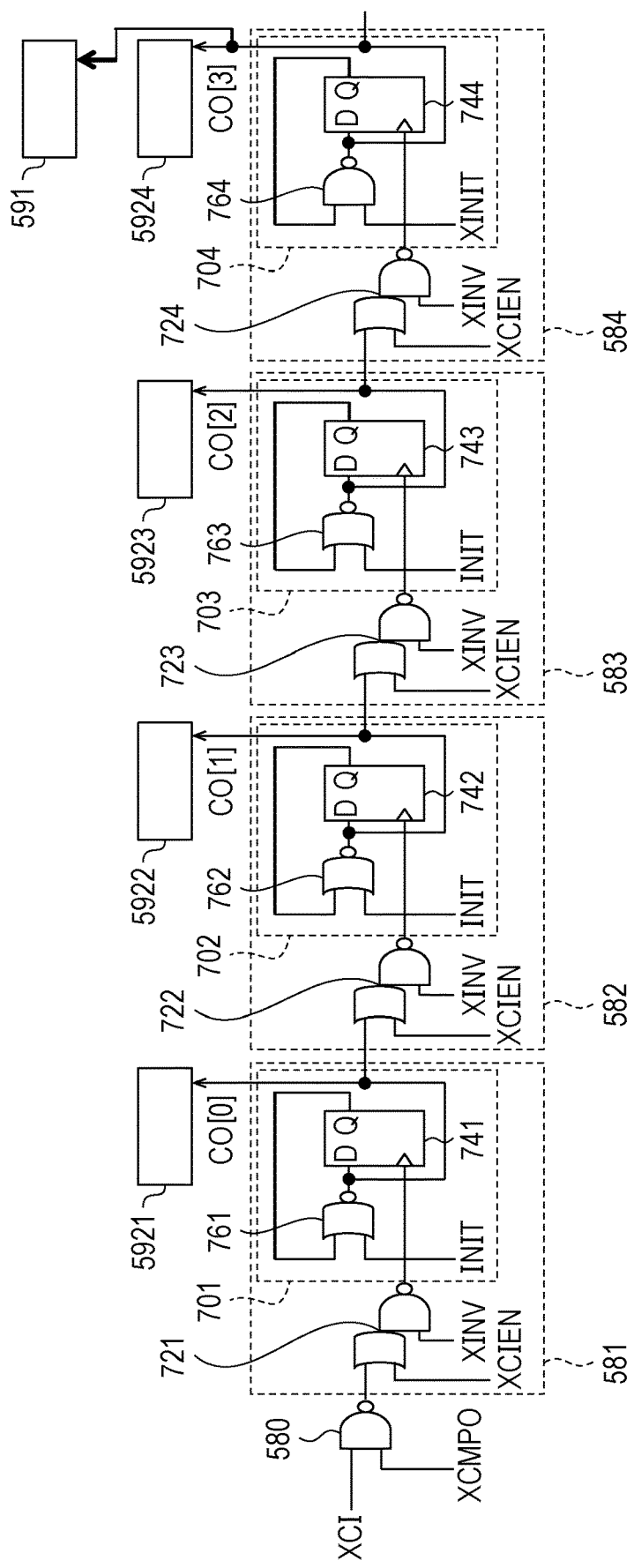

The counter and latch unit 56 of FIG. 7A is a specific configuration of the counter and latch unit 56 of FIG. 4. The counter and latch unit 56 is a 4-bit counter including four 1-bit counters 581, 582, 583, and 584.

FIG. 7B illustrates the driving operation example of the 4-bit counter of FIG. 7A.

Initialization Operation

An initialization operation is described first.

In the case of the TFF-IL, the signal XCIEN is transitioned to a high level, and the initialization signal INIT is transitioned to a high level (effective state). In this way, the input D of the DFF 741 is forced to a low level. If the signal XINV is transitioned to a low level in this condition, a CK input of the DFF 741 is transitioned from a low level to a high level, and the value (low) of the input D of the DFF 741 is transferred to an output Q. The initialization signal INIT is set back to a low level (release state), the signal XCIEN is transitioned back to a low level, and the signal XINV is transitioned back to a high level in that order. In this way, CO(0) is held at a low level, and a low level is set as an initial value.

Similarly, in the case of the TFF-IH, the signal XCIEN is transitioned to a high level, and the initialization signal XINIT is transitioned to a low level (effective state). In this way, the input D of the DFF 744 is forced to a high level. If the signal XINV is transitioned to a low level in this condition, a CK input of the DFF 744 is transitioned from a low level to a high level, and the value (high) of the input D of the DFF 744 is transferred to an output Q. The initialization signal XINIT is set back to a high level (release state), the signal XCIEN is transitioned back to a low level, and the signal XINV is transitioned back to a high level in that order. In this way, CO(3) is held at a high level, and a high level is set as an initial value.

The combination of the TFF-ILs and the TFF-IH determines a negative value of the initial value of the ripple counter.

Referring to FIG. 7A, a third bit is the TFF-IH, and 0 through second bits are the TFF-ILs, and the initialization operation sets the initial value (−Di) to be −8 (1000 b).

Counting Operation

The counting operation is described below.

At the timing indicated by the arrow 1, the initial value (−Di) is set to be −8 (=−$2^{4-1}$).

When the NAND gate 580 receives the clock signal XCI with the output signal XCMPO of the comparator 54 at a high level, the clock signal XCI is transferred to the inside of the counter 58. The counting operation starts, and the first AD conversion period begins. When the output signal XCMPO of the comparator 54 is transitioned to a low level, the clock signal XCI is blocked. At this moment, the count value is −5.

At the timing of an arrow mark 2, all bits CO(0), CO(1), CO(2), and CO(3) are inverted.

All-Bit Inversion Operation

An all-bit inversion operation is described below.

When the signal XCIEN is transitioned to a high level and the signal XINV is transitioned to a low level, CK inputs of DFF 741, DFF 742, DFF 743, and DFF 744 of each bit are transitioned from a low level to a high level. The inverted values of the outputs Q of DFF 741, DFF 742, DFF 743, and DFF 744 are transferred to the inputs D of DFF 741, DFF 742, DFF 743, and DFF 744. The outputs Q of DFF 741, DFF 742, DFF 743, and DFF 744 are thus updated. Through the operation described above, the outputs of all bits of the counter are inverted.

Referring to FIG. 7B, the count value is converted from −5 (1011 b) to 4 (0100 b).

After the inversion operation, the clock signal XCIEN is transitioned back to a low level, and the signal XINV is transitioned back to a high level. The counting operation is thus enabled.

The output signal XCMPO of the comparator 54 transitions to a high level, the second AD conversion period begins, and the clock signal XCI is input. The counter 58 starts the counting operation with the inverted value (4 in the case of FIG. 7B) being as the initial value. In a way similar to the first AD conversion period, the count value (13 in the case of FIG. 7B) is held at the moment the output signal XCMPO of the comparator 54 transitions to a low level.

The held count value is calculated by adding a value Dr counted up during the first AD conversion period to the initial value −Di to determine the sum (−Di+Dr), by inverting the sum (−Di+Dr) to determine the inverted sum (−(−Di+Dr)−1), and by adding a value Ds counted up during the second AD conversion period to the inverted sum to determine the total sum (−(−Di+Dr)−1+Ds)=((Ds−Dr)+(Di−1)).

The value desired is a difference (Ds−Dr) between the value Ds as a result of counting up during the second AD conversion period and the value Dr as a result of counting up during the first AD conversion period. The value desired is simply obtained by determining a difference between the held count value and the value (Di−1) as a result of inverting the initial value −Di. Referring to FIG. 7B, (Ds−Dr) is 6 (=13−(8−1)).

A negative initial value of the counter 58 may be set to be −$2^{N-1}$ or higher in the case of an N-bit counter. Referring to FIG. 7B, the initial value is found to be −$2^{4-1}$ (=−8).

Driving Operation Example of Counter During Normal Operation

Figure 8A:
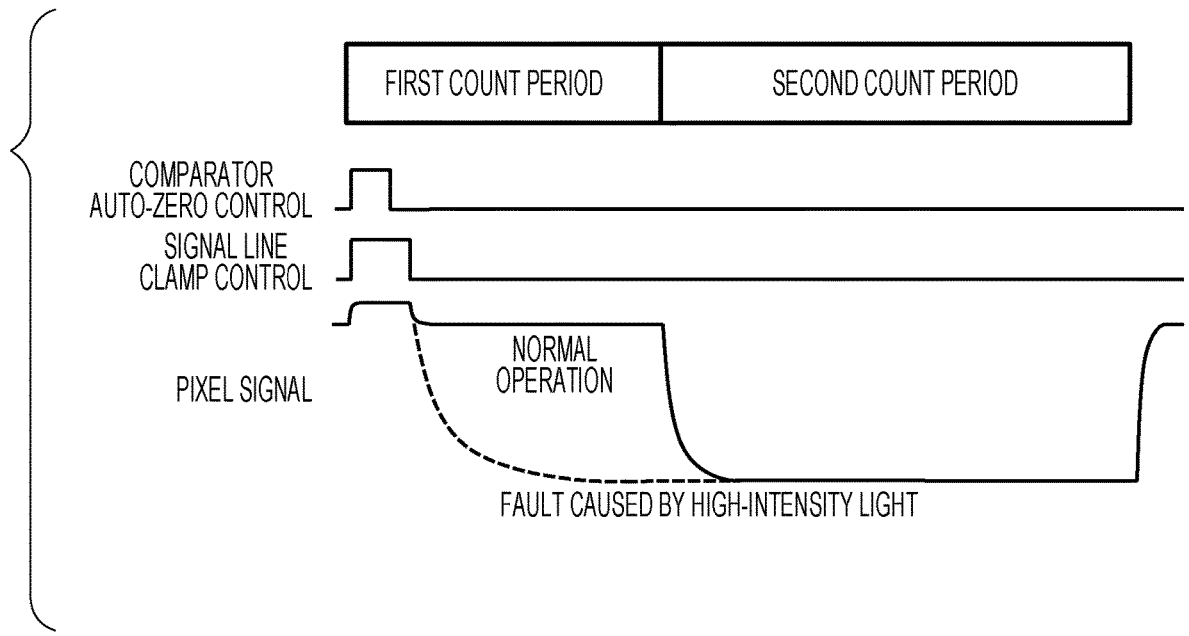
FIG. 8A and FIG. 8B illustrate a driving operation example of the counter and latch unit during a normal operation.
Figure 8B:
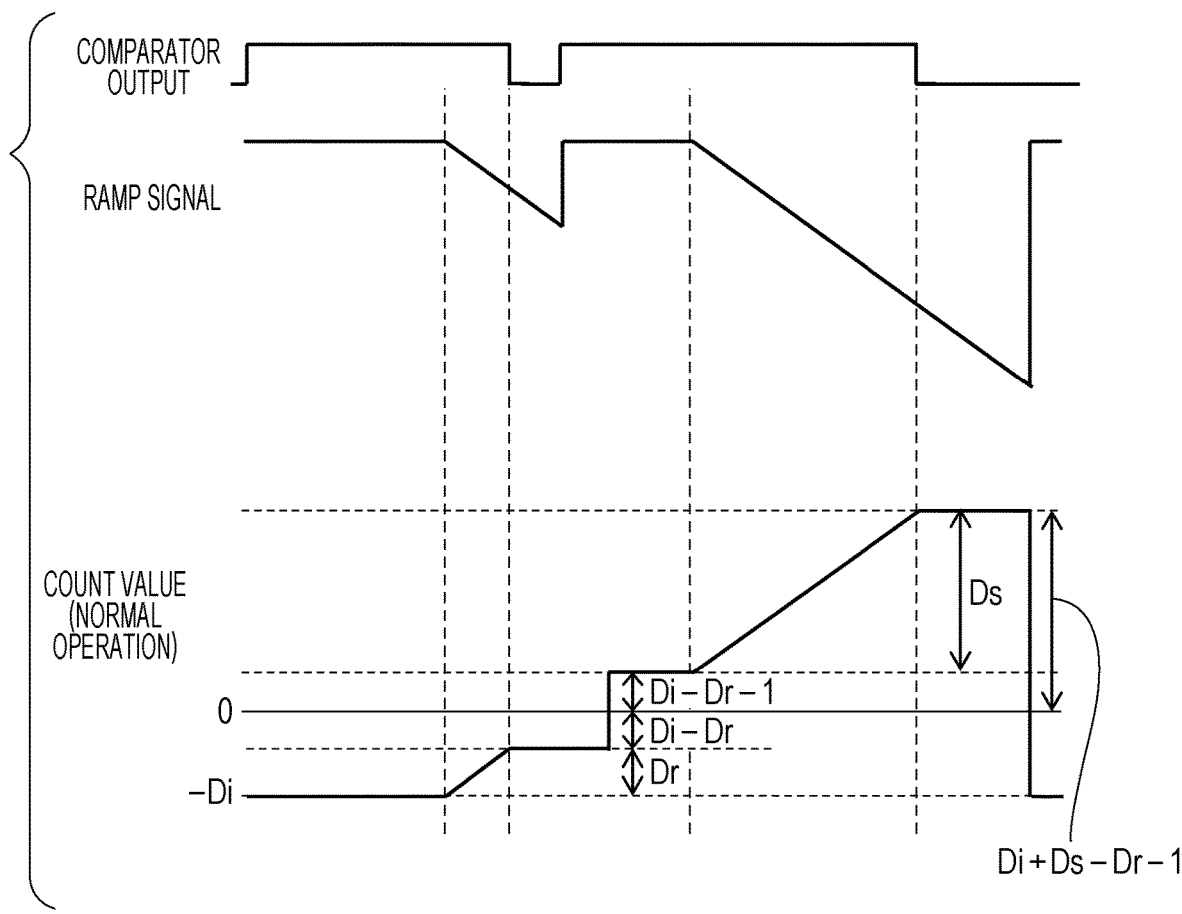

FIG. 8A and FIG. 8B illustrate an driving operation example of the solid-state imaging device 1 of the embodiment. FIG. 8A illustrates a control operation example of the solid-state imaging device 1. FIG. 8B illustrates an output of the solid-state imaging device 1 during a normal operation.

The counter 58 sets the initial value during the first count period to be a negative value −Di. The counter 58 AD-converts a pixel reset potential during the first AD conversion period.

The counter 58 performs the first counting operation in response to the pixel reset potential, and stops the first count operation in response to a change in the output signal of the comparator 54. The first latch unit 591 holds the most significant bit of a first count value (−Di+Dr) at the stop of the counting operation during the first count period.

The counter 58 sets a value (Di−Dr−1) obtained as a result of inverting all bits of the first count value to be an initial value during the second count period. The counter 58 AD-converts the pixel signal potential during the second AD conversion period. The counter 58 performs the second counting operation in response to the pixel signal potential, and then stops the second counting operation in response to a change in the output signal of the comparator 54. The second latch unit 592 holds all bits of a second count value (Di−Dr−1+Ds).

As described above, the second count value ((Ds−Dr)+(Di−1)) is the sum of the inverted initial value and the difference between the pixel reset potential and the pixel signal potential.

Since the initial value is negative and the first count value is inverted in accordance with the embodiment, the second count value may not take a negative value during the normal operation. The embodiment does not involve adding 1 bit for sign on the N bit counter. The circuit scale and the power consumption are thus reduced.

Driving Operation Example of Counter During Faulty Operation

Figure 9A:
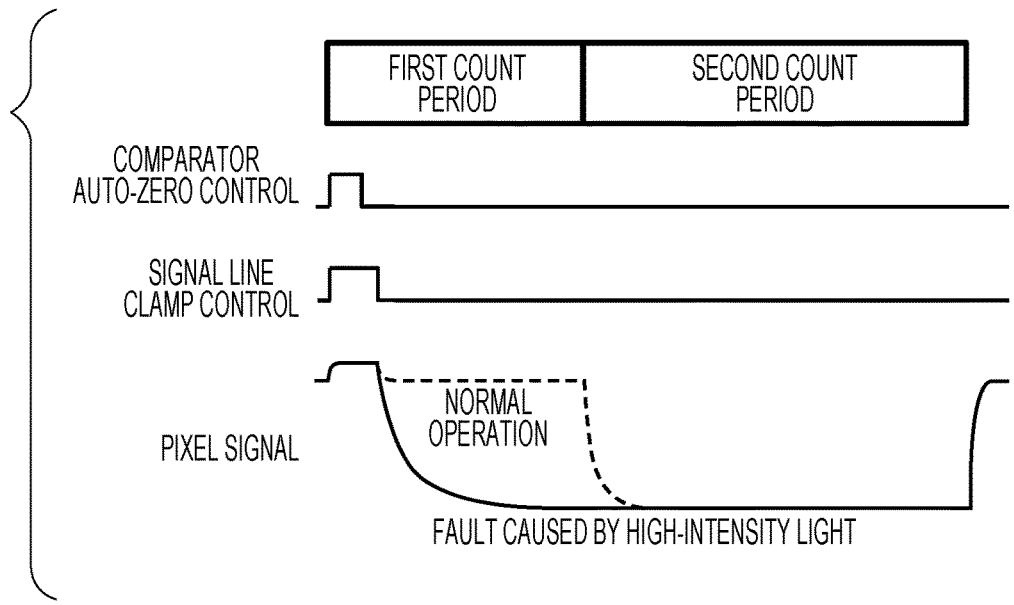
FIG. 9A and FIG. 9B illustrate a driving operation example of the counter and latch unit during a faulty operation.
Figure 9B:
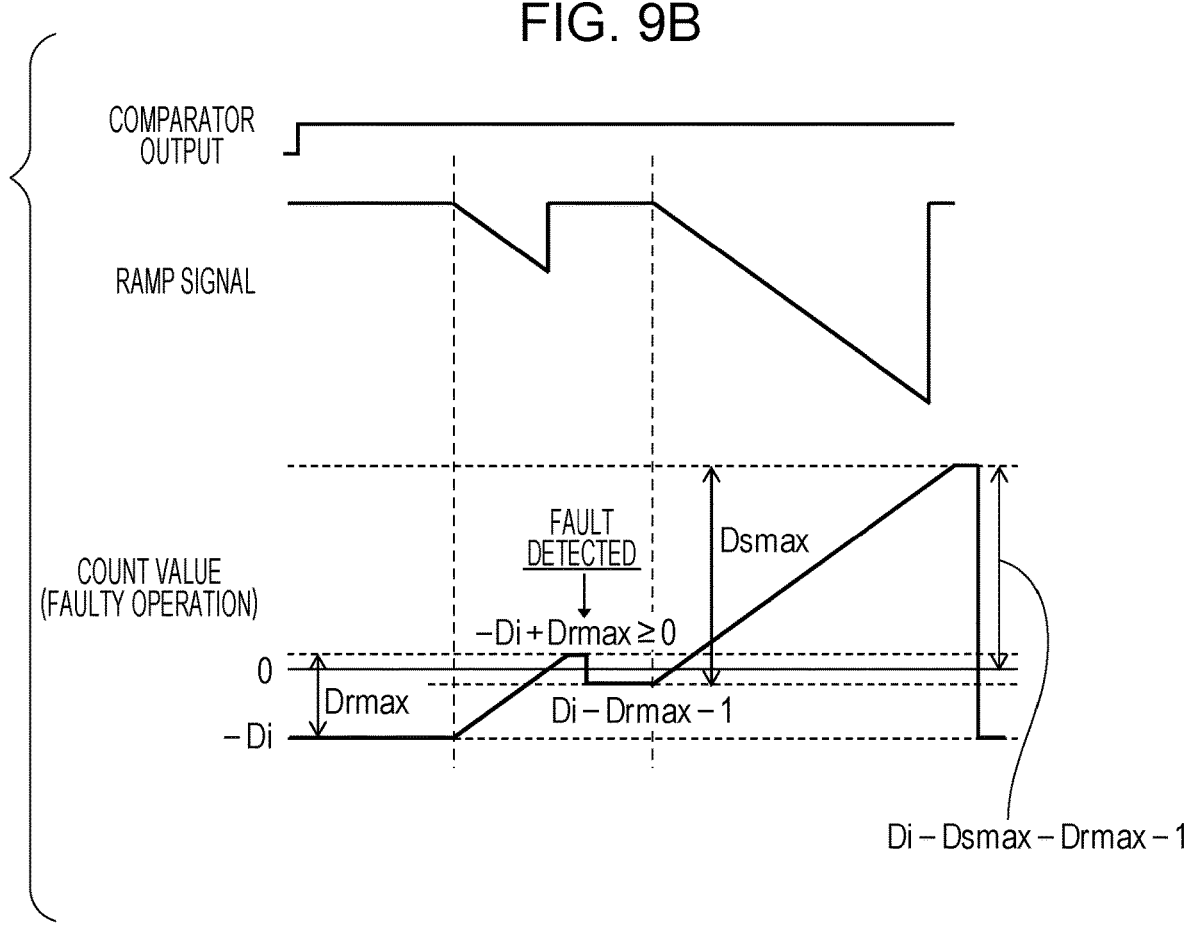

FIG. 9A and FIG. 9B illustrate a driving operation example of the solid-state imaging device 1 of the first embodiment during a faulty operation. FIG. 9A illustrates a control operation example of the solid-state imaging device 1, and FIG. 9B illustrates as output example during a faulty operation.

A maximum value Drmax during the first AD conversion period may set to be (Di+1) or higher, based on 1 clock unit, if the initial value is −Di (Di is a natural number) during the first count period. More specifically, the first count value may be Drmax during the faulty operation.

Since the output of the comparator 54 remains unchanged during the faulty operation as illustrated in FIG. 9B, the first counting operation is performed until the maximum value Drmax is reached during the first AD conversion period. Since Drmax is Di or higher, the first count value is 0 or higher. For this reason, the most significant bit of the first count value held by the first latch unit 591 is 0 (since a negative value is held during the normal operation, the most significant bit is 1). The value held on the first latch unit 591 allows to be made a determination as to whether a fault, such as reception of high-intensity light, has been detected. Detection of the occurrence of a fault, such as the reception of high-intensity light, is thus easily performed. This arrangement is free from a circuit and a detection period to detect the occurrence of a fault, such as the reception of high-intensity light, and leads to a reduction in the circuit scale and lower power consumption.

The solid-state imaging device 1 includes a subsequent stage logic circuit that receives the output from the latch unit. The subsequent logic circuit determines the output of the first latch unit serving as a flag for high-intensity light detection. When the subsequent logic circuit determines that the output of the first latch unit is the high-intensity light, the subsequent logic circuit replaces the output of the pixel with full code regardless of the output of the latch unit. If the subsequent stage logic circuit does not determine that the output is not the high-intensity light, the subsequent stage logic circuit outputs the output of the latch circuit as it is.

In this way, the difference between the pixel reset potential and the signal potential is acquired from the value held on the second latch unit 592, and the occurrence of a fault is detected from the value held on the first latch unit 591.

Figure 10A:
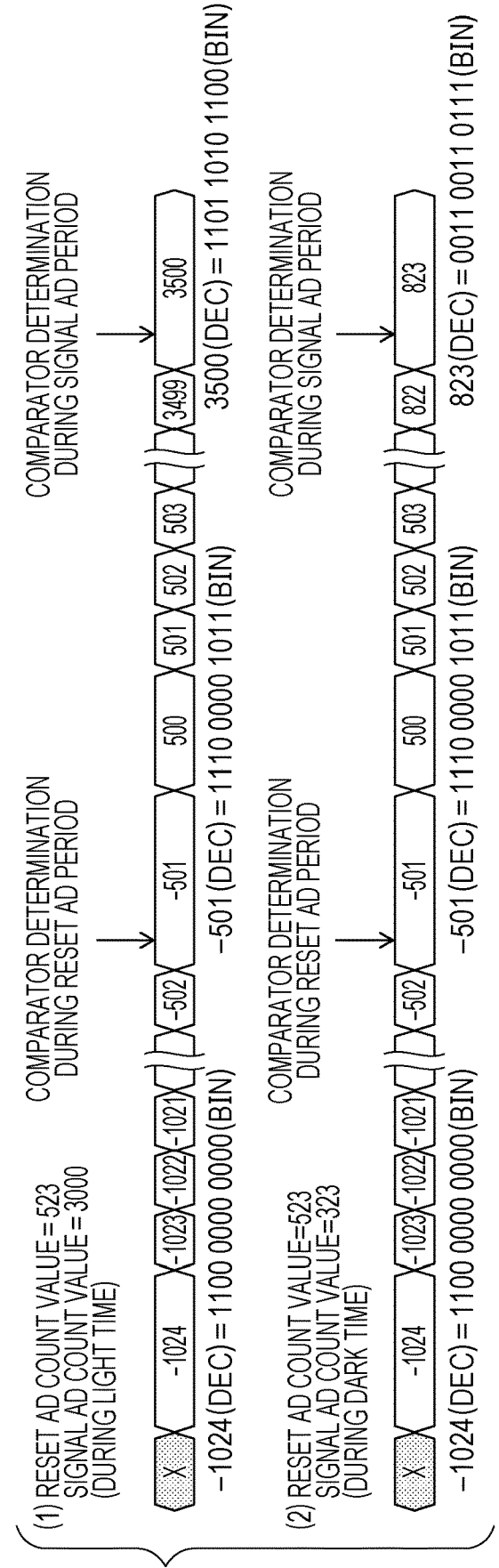
FIG. 10A and FIG. 10B specifically illustrate how a count value changes.
Figure 10B:
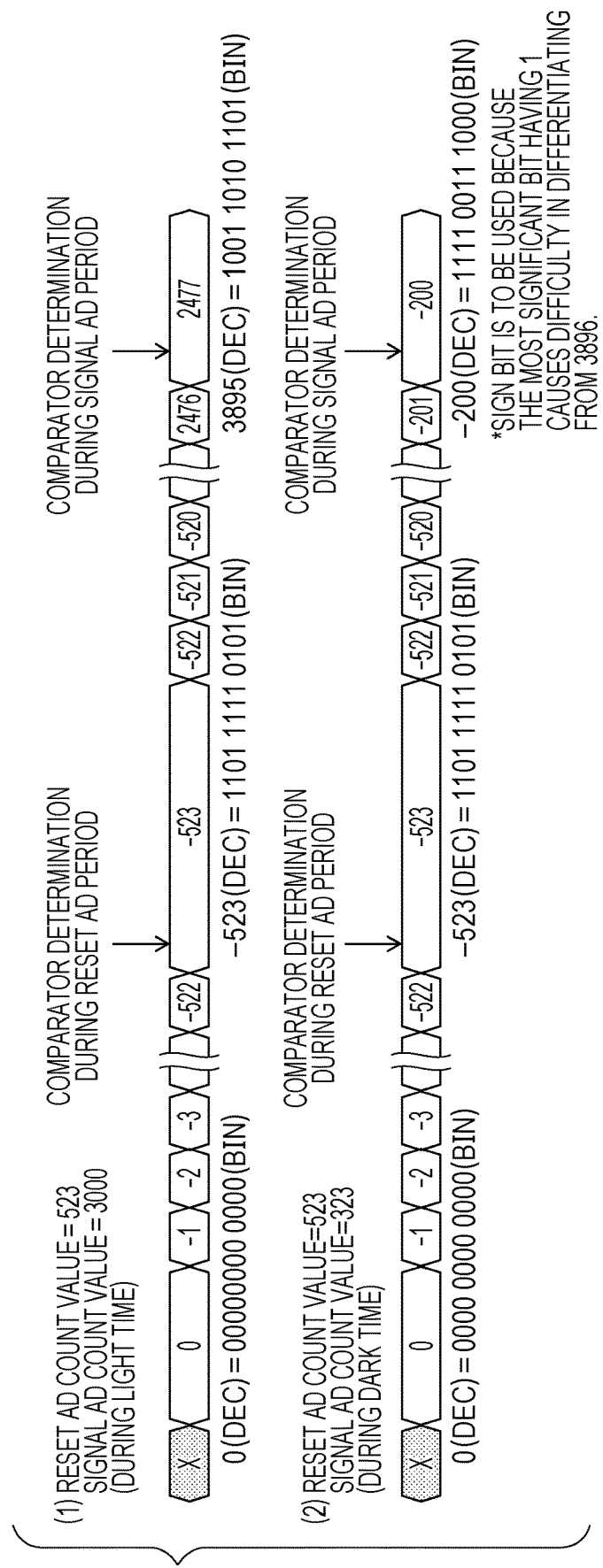

Referring to FIG. 10A and FIG. 10B, a change in the count value is described. FIG. 10A illustrates a change in the count value of the counter 58 in the AD converter 50 of the first embodiment. FIG. 10B illustrates a change in the count value of a counter as a comparative example.

Referring to FIG. 10A and FIG. 10B, in case (1), the result of the first counting operation responsive to the pixel reset potential is 525, and the result of the second counting operation responsive to the pixel signal potential is 3000 for light time. In case (2), the result of the first counting operation responsive to the pixel reset potential is 523, and the result of the second counting operation responsive to the pixel signal potential is 323 for dark time.

The first embodiment is further described below.

Referring to case (1) of FIG. 10A, the counter 58 sets the initial value for the counting operation during the first count period to be a negative value of "−1024", starts the counting operation during the first count period, and then stops the counting operation in response to a change in the output of the comparator 54. The count value subsequent to the end of the counting operation during the first count period is −501 (=−1024+523). The counter 58 inverts the count value subsequent to the end of the counting operation, thereby setting the count value to be 500 (=−(−501+1)). The counter 58 starts the counting operation during the second count period with the inverted count value being the initial value, and stops the counting operation in response to a change in the output the comparator 54. The count value subsequent to the end of the counting operation during the second count period is 3500 (=500+3000).

Referring to case (2) of FIG. 10A, the counter 58 sets the initial value for the counting operation during the first count period to be a negative value of "−1024", starts the counting operation during the first count period, and then stops the counting operation in response to a change in the output of the comparator 54. The count value subsequent to the end of the counting operation during the first count period is −501 (=−1024+523). The counter 58 inverts the count value subsequent to the end of the counting operation, thereby setting the count value to be 500 (=−(−501+1)). The counter 58 starts the counting operation during the second count period with the inverted count value being the initial value, and stops the counting operation in response to a change in the output the comparator 54. The count value subsequent to the end of the counting operation during the second count period is 823 (=500+323).

In accordance with the first embodiment, the count value subsequent to the end of the counting operation during the second count period is a positive value regardless of whether it is light time or dark time. The 1 bit for sign is not used. When the AD conversion is performed at 12 bit accuracy, a 12-bit counter is simply used.

The comparative operation example is described below.

Referring to case (1) of FIG. 10B, the counter sets the initial value for the counting operation during the first count period to be zero, starts down counting, and then stops down counting in response to a determination of the comparator. The count value subsequent to the end of the counting operation curt ng the first count period is −523. The counter starts up counting during the second count period with the initial value being the count value subsequent to the end of the counting operation during the first count period, and then stops up counting in response to the determination of the comparator. The count value subsequent to the end of the counting operation during the second count period is 2477 (=−523+3000).

Referring to case (2) of FIG. 10B, the counter sets the initial value for the counting operation during the first count period to be zero, starts down counting, and then stops down counting in response to the determination of the comparator. The count value subsequent to the end of the counting operation during the first count period is −523. The counter starts up counting during the second count period with the initial value being the count value subsequent to the end of the counting operation during the first count period, and then stops up counting in response to the determination of the comparator. The count value subsequent to the end of the counting operation during the second count period is −200 (=−523+323).

In the comparative operation example, the count value subsequent to the end of the counting operation during the second count period is a positive value during light time, but the count value subsequent to the end of the counting operation during the second count period is a negative value during dark time. This means 1 bit for sign is used. When the AD conversion is performed at 12 bit accuracy, a 13-bit counter is used.

Second Embodiment

A second embodiment of the disclosure is described with reference to FIG. 11. A counter 58a of the second embodiment is different in configuration from the counter of the first embodiment.

Figure 11:
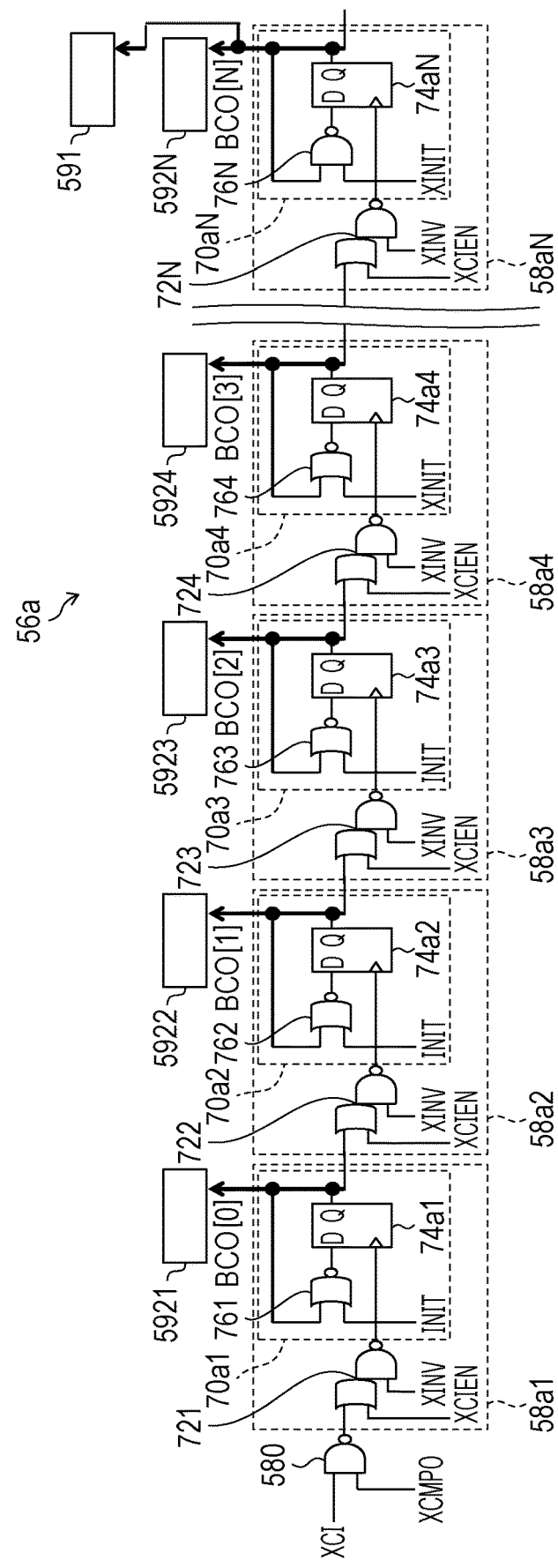
FIG. 11 illustrates the configuration of a counter and latch unit in a sold-state imaging device of a second embodiment of the disclosure.

FIG. 11 illustrates the counter 58a of the second embodiment. In accordance with the second embodiment, the outputs Q of DFF 74a1, DFF 74a2, DFF 74a3, DFF 74a4, . . . , DFF 74aN are respectively connected to second latch units 7921, 7922, 7923, 7924, . . . , 792N, and composite gates 721, 722, 723, 724, . . . , 72N. The configuration of the second embodiment operates in a way similar to the first embodiment.

Third Embodiment

A third embodiment of the disclosure is described with reference to FIG. 12 and FIG. 13A and FIG. 13B. For convenience of explanation, elements having functionalities identical to those of the first embodiment are designated with the same reference numerals and the discussion thereof is omitted herein.

Configuration of Solid-State Imaging Device

Figure 12:
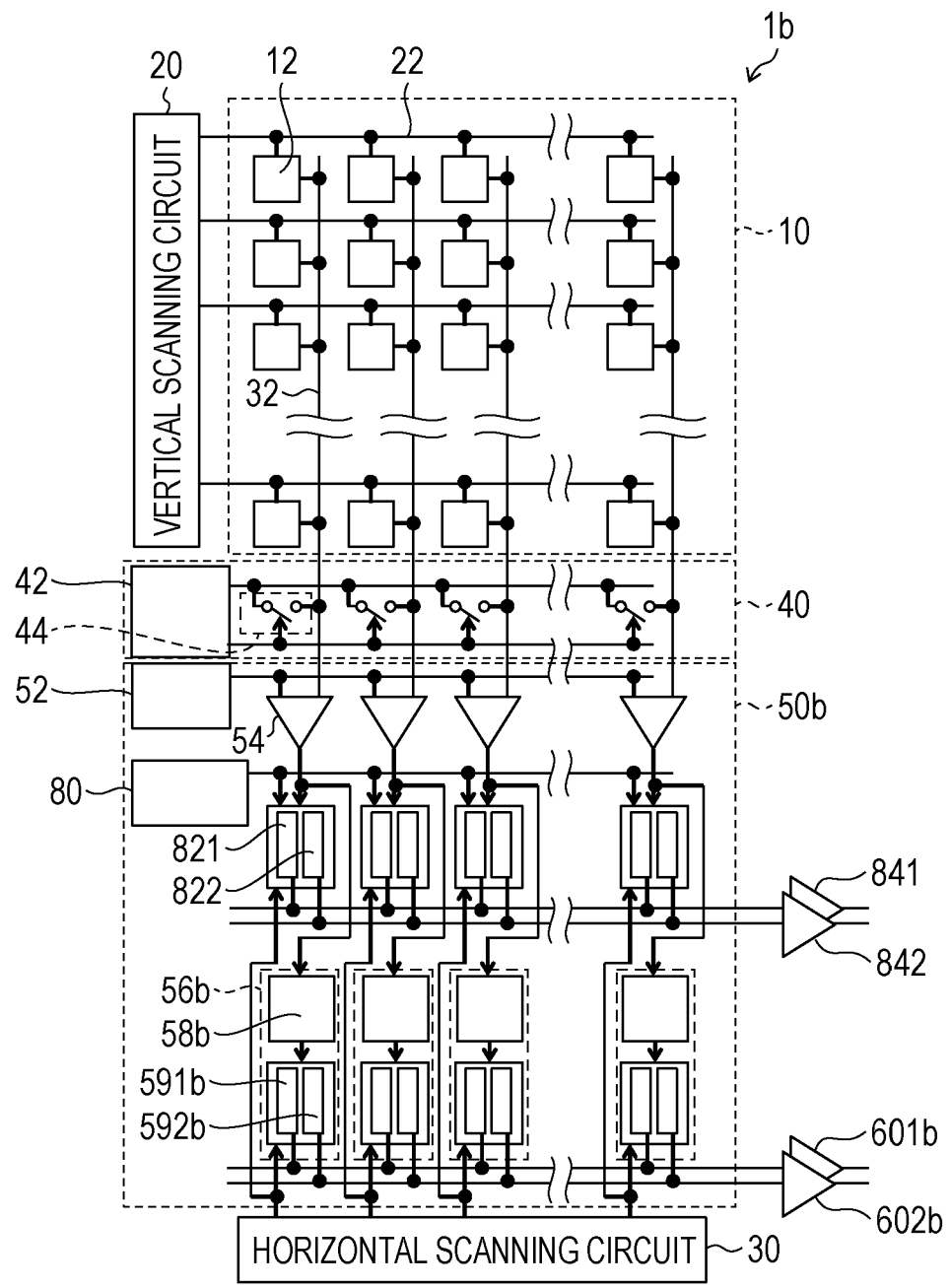
FIG. 12 is a block diagram illustrating the configuration of a solid-state imaging device of a third embodiment of the disclosure.

FIG. 12 is a block diagram illustrating the configuration of a solid-state imaging device 1b of the third embodiment.

In accordance with the third embodiment, a counter and latch unit 56b includes at high-order bits thereof a high-order bit counter 58b as a ripple counter, a high-order bit first latch unit 591b, and a high-order bit second latch unit 592b. The counter and latch unit 56b includes low-order bits thereof a low-order bit counter 80 as a gray code counter, a low-order bit first latch unit 821, and a low-order bit second latch unit 822.

Each high-order bit first latch unit 591a on each pixel column is connected to a high-order bit first sensor amplifier 601a. Each high-order bit second latch unit 592a on each pixel column is connected to a high-order bit second sensor amplifier 602a. Each low-order bit first latch unit 821 on each pixel column is connected to a low-order bit first sensor amplifier 841. Each low-order bit second latch unit 822 on each pixel column is connected to a low-order bit second sensor amplifier 842.

Configuration of High-Order Bit Counter

Figure 13A:
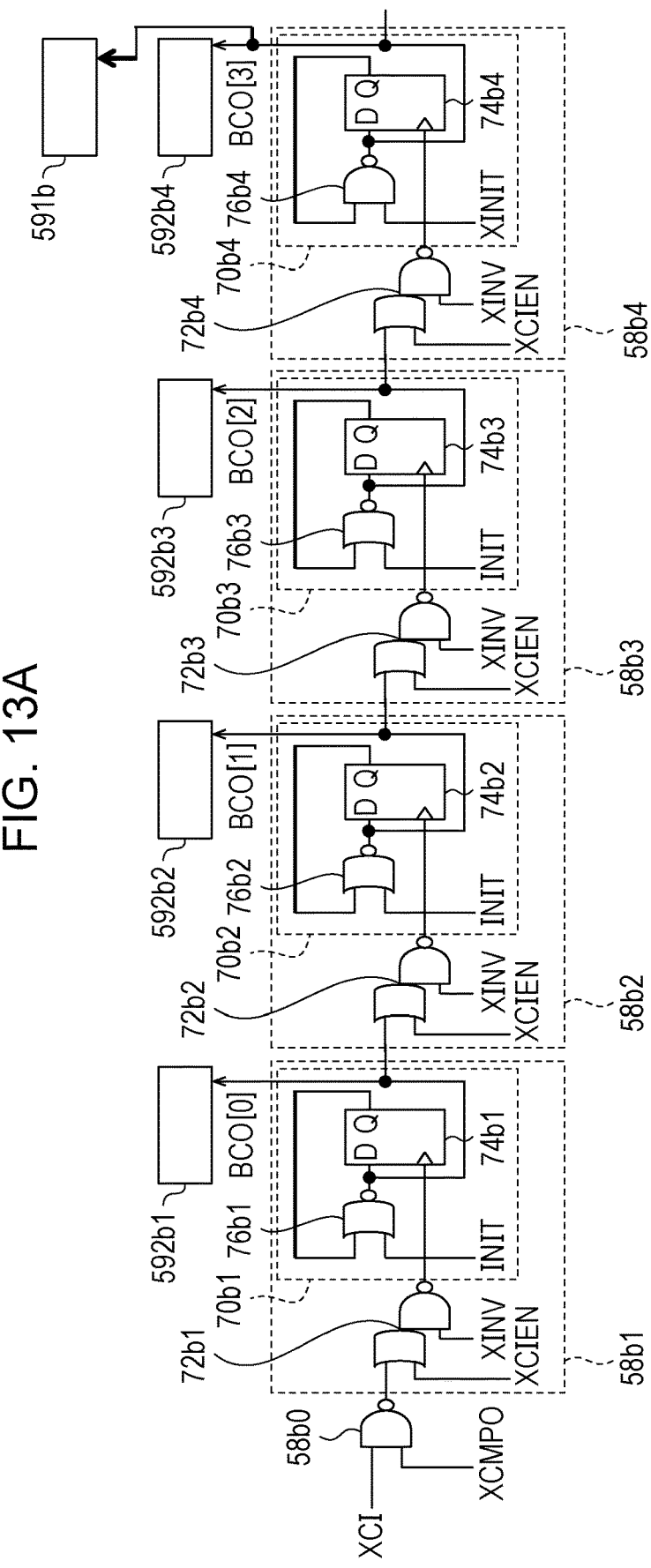
FIG. 13A and FIG. 13B illustrate an driving operation example of a counter in the solid-state imaging device of the third embodiment of the disclosure.

FIG. 13A illustrates a 4-bit ripple counter as a specific example of the high-order bit counter 58b. The 4-bit ripple counter is identical in configuration to the 4-bit ripple counter of FIG. 7A.

Driving Operation Example of Low-Order Bit Counter

Figure 13B:
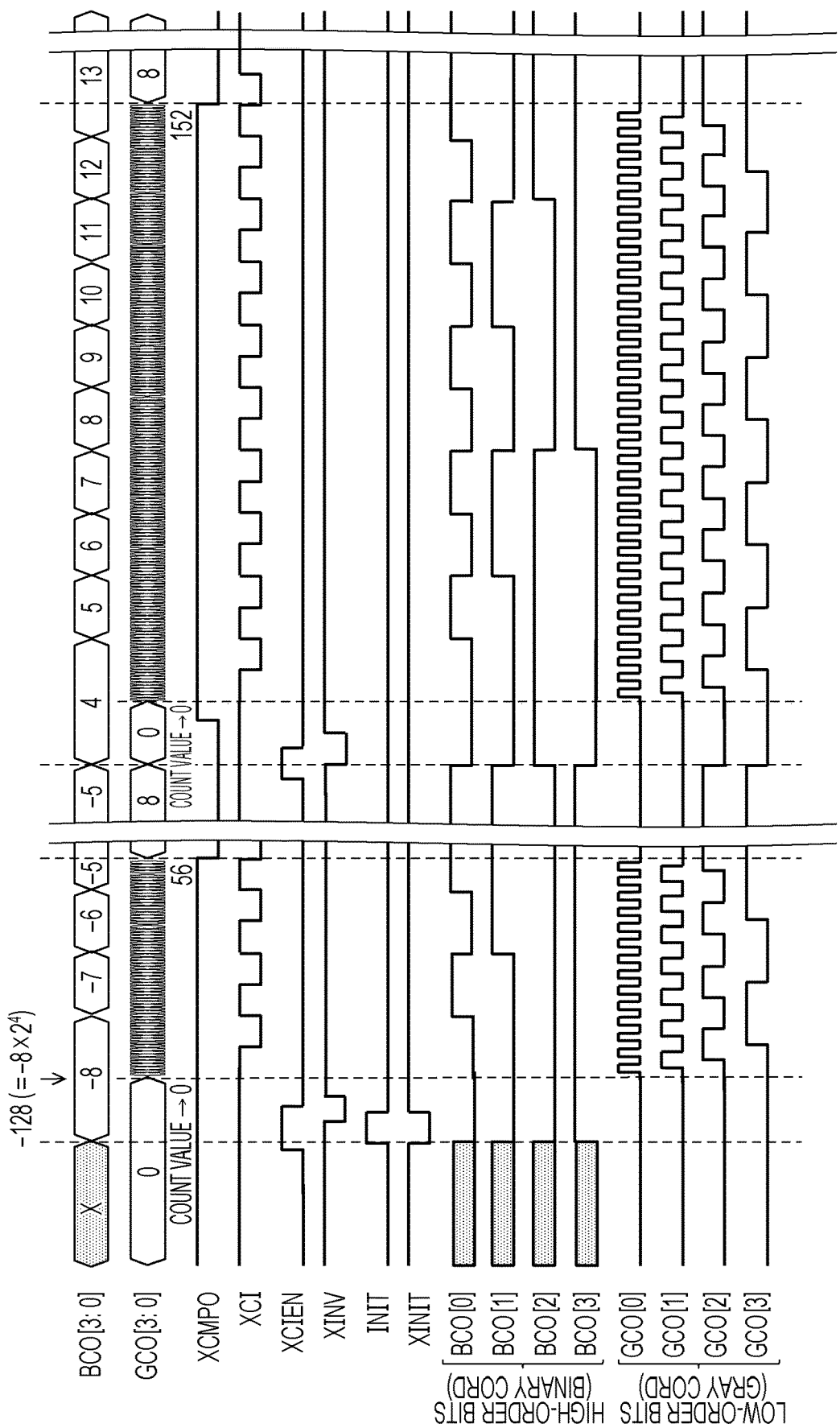
Figure 14A:
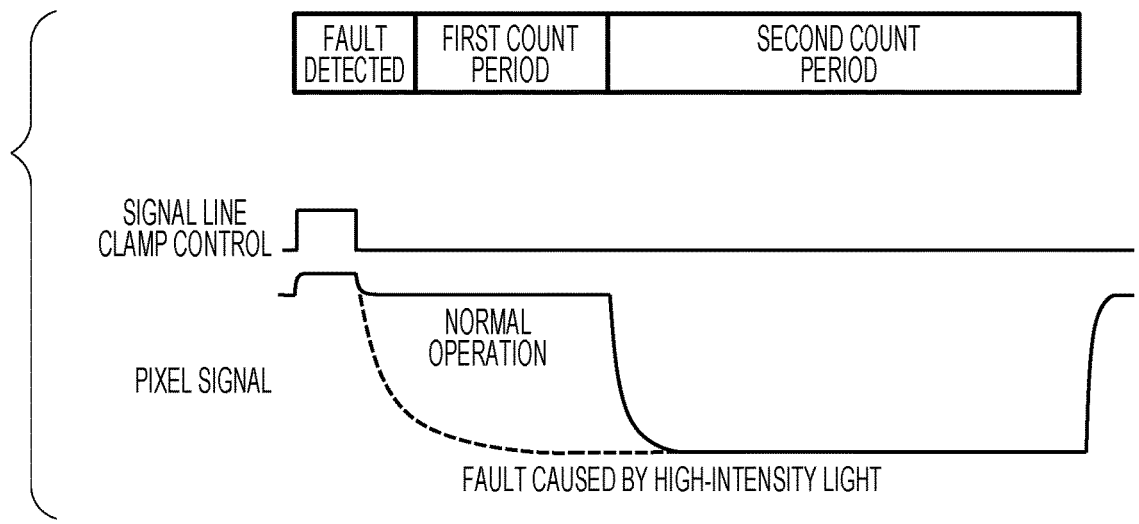
FIG. 14A and FIG. 14B illustrate a driving operation example of a counter and latch unit of related art.
Figure 14B:
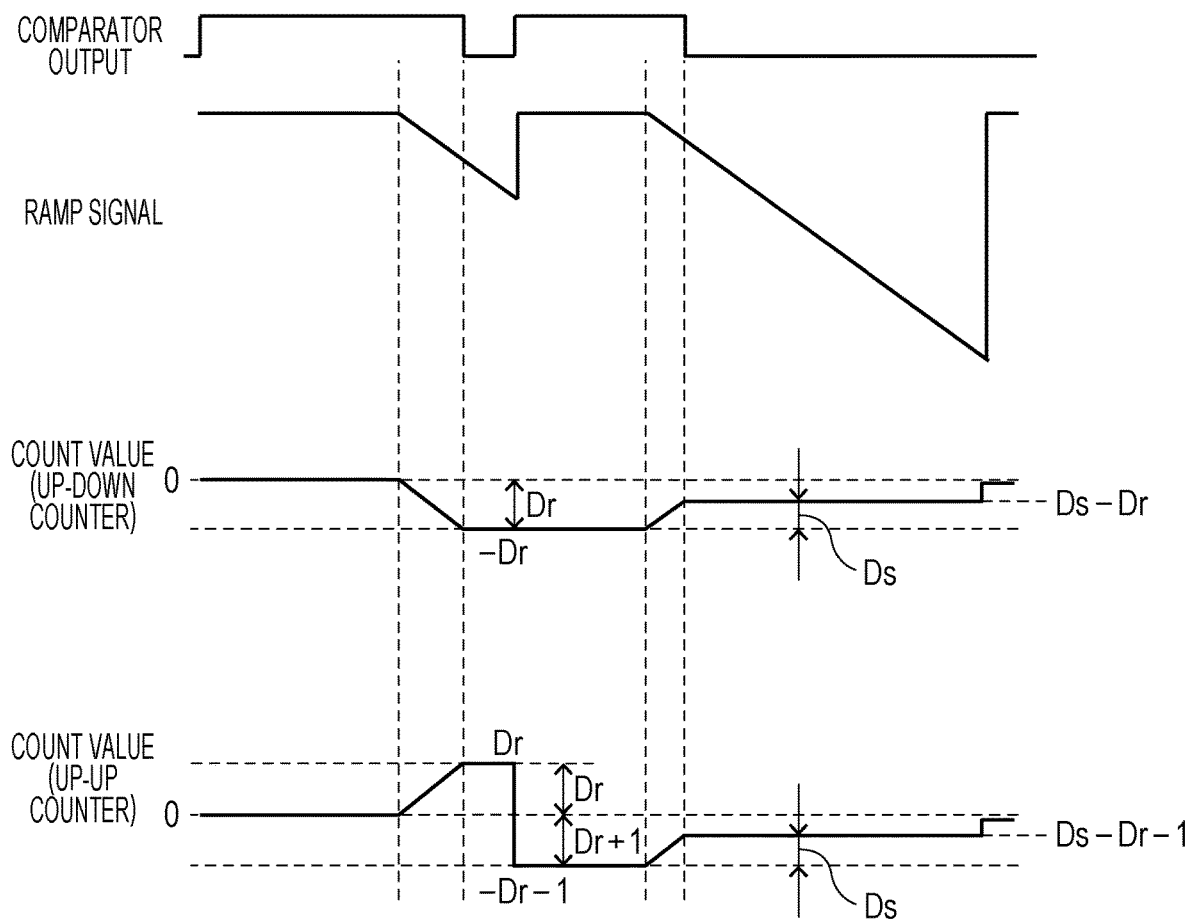

FIG. 13B illustrates a driving operation example of the high-order bit counter 58b as a 4-bit ripple counter with the low-order bit counter 80 thereof being a 4-bit gray code counter. The initial value −Di is −128, the reset AD count value Dr is 56, and the signal AD count value Ds is 152.

Referring to FIG. 13B, the operation of the low-order bit counter 80 is described below.

At the low-order bits of the counter and latch unit 56b, the low-order bit first latch unit 821 and the low-order bit second latch unit 822 hold the value of the low-order bit counter 80. The low-order bit counter 80 is arranged on every pixel column unit formed of one or more pixel columns.

The low-order bit counter 80 starts the counting operation at the timing responsive to the clock signal XCI input from the high-order bit counter 58b, and up-counts from the initial value 0 during each of the first AD conversion period and the second AD conversion period.

The low-order bit first latch unit 821 holds a low-order bit portion of the first count value counted during the first AD conversion period. The low-order bit second latch unit 822 holds a low-order bit portion of the second count value counted during the second AD conversion period.

Referring to FIG. 13B, a difference value between the first count value and the second count value of 8 bits is calculated from the output value (208) of high-order 4 bits of the difference between the first count value and the second count value, the output value (8) of low-order 4 bits of the first count value, and the output value (8) of low-order 4 bits of the second count value.

High-Order 4 Bits

From Initial value of −Di (high-order)=−8, and counter output value of (Di (high-order)+Ds (high-order)−Dr (high-order)−1=13), (Ds (high-order)−Dr (high-order)=6) is determined.

Low-Order 4 Bits

From Dr (low-order) of 8, and Ds (low-order) of 8, (Ds (low-order)−Dr (low-order)=0) is determined.

Composite High-Order 4 Bits and Low-Order 4 Bits

Ds−Dr={Ds (high-order)−Dr (high-order)}×$2^4$−{Ds (low-order)−Dr (low-order)}=96−0=96 Note that the AD conversion is performed on a per pixel column basis in accordance with the third embodiment. Alternatively, the AD conversion may be performed on a per pixel basis or on a per pixel group basis (predetermined number of rows× predetermined number of columns).

According to a first aspect of the disclosure, the AD converter (the AD converter 50 or 50b) converts a potential of the pixel signal line 32 into a digital signal during each of the first count period and the second counter period in succession to the first count period. The AD converter (the AD converter 50 or 50b) includes the comparator 54 that compares the potential of the pixel signal line 32 with the reference potential that is the potential of the ramp waveform changing with time, the counter 58, 58a, or 58b that stops the counting operation in response to a change in the output of the comparator 54, and the all-bit latch unit (the second latch unit 592 or 592b) that holds all bits of the count value subsequent to stopping the counting operation during the second count period. The counter 58, 58a, or 58b sets the initial value for the counting operation during the first count period to be a negative value, and prior to the counting operation during the second count period, inverts all bits of the count value subsequent to stopping the counting operation during the first count period.

In the configuration described above, the AD conversion is performed without using a bit for sign.

According to a second aspect of the disclosure, in view of the AD converter (the AD converter 50 or 50b) of the first aspect, the counter 58, 58a, or 58b may start the counting operation in response to the change in the reference potential.

According to a third aspect of the disclosure, the AD converter (the AD converter 50 or 50b) of the first aspect may further include the most-significant bit latch unit (the first latch unit 591 or 591b) that holds the count value at the most-significant bit of the counter 58, 58a, or 58b subsequent to stopping the counting operation during the first count period.

In the configuration described above, the occurrence of a fault is detected.

According to a fourth aspect of the disclosure, in view of the AD converter (the AD converter 50b) of the first aspect, the counter 58, 58a, or 58b may perform the counting operation during the first count period until the count value reaches a first predetermined value. The counter 58, 58a, or 58b may perform the counting operation during the second count period until the count value reaches a second predetermined value.

The counter 58, 58a, or 58b may count to the first predetermined value but is unable to count beyond the first predetermined value. Similarly, the counter 58, 58a, or 58b may count to the second predetermined value but is unable to count beyond the second predetermined value. If no change occurs in the output of the comparator even when the count value reaches the first predetermined value, the counter 58, 58a, or 58b stops the counting operation. Similarly, if no change occurs in the output of the comparator even when the count value reaches the second predetermined value, the counter 58, 58a, or 58b stops the counting operation. In the configuration described above, even if a fault occurs and no output is provided from the comparator 54, the counting operation continues during the first count period until the count value reaches the first predetermined value, and then the counting operation is stopped. The occurrence of a fault may be detected during the first count period.

According to a fifth aspect of the disclosure, in view of the AD converter (the AD converter 50) of the first aspect, the counter 58 or 58a may include a ripple counter.

In the configuration described above, the counting operation is performed with a simple structure.

According to a sixth aspect of the disclosure, in view of the AD converter (the AD converter 50b) of the first aspect, a high-order bit of the counter 58b may include a ripple counter and a low-order bit of the counter 58b may include a gray-code counter.

In the configuration described above, the AD converter of the sixth aspect provides the same effectiveness as the AD converter of the first aspect.

According to a seventh aspect of the disclosure, in view of the AD converter (the AD converter 50 or 50b) of the fifth aspect, the ripple counter may include a toggle flipflop (TFF) and a composite (OR-NAND) gate, the composite gate may be connected to an input clock of the TFF, the TFF may be configured such that a NAND gate or a NOR gate is connected to an input of a D-flipflop (DFF), and an output of the DFF and an initialization signal may be connected to inputs of the NAND gate or the NOR gate.

In the configuration described above, the AD converter of the seventh aspect provides the same effectiveness as the AD converter of the first aspect.

According to an eighth aspect of the disclosure, in view of the AD converter (the AD converter 50 or 50b) of the first aspect, the initial value of the counter 58, 58a, or 58b during the first count period may be equal to or above $-2^{N-1}$ if the counter 58, 58a, or 58b is an N-bit counter.

In the configuration described above, the occurrence of a fault is more accurately detected.

According to a ninth aspect of the disclosure, in view of the AD converter (the AD converter 50 or 50b) of the first aspect, the first count period may be equal to or above (Di+1) with one clock being unit if the initial value of the counter 58, 58a, or 58b is −Di during the first count period, wherein Di is a natural number.

In the configuration described above, the occurrence of a fault is more accurately detected.

According to a tenth aspect of the disclosure, there is provided a solid-state imaging device 1 or 1b. The solid-state imaging device 1 or 1b includes the AD converter (the AD converter 50 or 50b) of the first aspect, the pixel unit 10 that includes an array of a plurality of pixels that perform photoelectric conversion, the ramp generator 52 that generates the ramp waveform, and the clamp unit 40 that holds the potential of the pixel signal line 32 to a predetermined potential or higher during the auto-zero period of the comparator 54. The comparator 54 reads the potential of the pixel signal line 32 every predetermined number of pixels.

In the configuration described above, the solid-state imaging device of the tenth aspect provides the same effectiveness as the AD converter of one of the first through ninth aspects.

According to an eleventh aspect of the disclosure, in the solid-state imaging device 1 or 1b of the tenth aspect, a clamp potential of the clamp unit 40 may be higher than the potential of the pixel signal line 32 during the first count period and lower than a potential of a power source of the pixel unit 10.

In the configuration described above, the reference potential of the ramp waveform is changed from a high potential to a low potential.

According to a twelfth aspect of the disclosure in view of the solid-state imaging device 1 or 1b of the tenth aspect, the clamp potential of the clamp unit 40 may change in response to the gradient of the ramp waveform.

When the gradient of the ramp signal becomes smaller, the offset value in the count result increases. The clamp potential is adjusted in response to the gradient of the ramp signal. In the configuration described above, the offset value in the count result is set to be constant. This controls an excessive increase in the offset value in the count result that could lead to a faulty determination as to whether high-intensity light has been received.

According to a thirteen aspect of the disclosure, in view of the solid-state imaging device 1 or 1b of the tenth aspect, the potential of the clamp unit 40 may change in a manner such that a potential difference between the clamp potential and the potential of the pixel signal line 32 during the first count period is proportional to the gradient of the ramp waveform.

Since the offset value in the count result is related to the clamp potential, the solid-state imaging device 1 changes the offset value in the count result in response to the potential difference between the pixel reset potential and the clamp potential.

The present disclosure contains subject matter related to that disclosed in Japanese Priority Patent Application JP 2017-177075 filed in the Japan Patent Office on Sep. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An analog-to-digital (AD) converter converting a potential of a pixel signal line into a digital signal during each of a first count period and a second counter period in succession to the first count period, the AD converter comprising:
   a comparator that compares the potential of the pixel signal line with a reference potential that is a potential of a ramp waveform changing with time;
   a counter that stops a counting operation in response to a change in an output of the comparator;
   a most-significant bit latch unit that holds only a most-significant bit of a count value of the counter subsequent to stopping the counting operation during the first count period, and
   an all-bit latch unit that holds all bits of a count value subsequent to stopping the counting operation during the second count period,
   wherein the counter sets an initial value for the counting operation during the first count period to be a negative value, and prior to the counting operation during the second count period, inverts all bits of the count value subsequent to stopping the counting operation during the first count period.

2. The AD converter according to claim 1, wherein the counter starts the counting operation in response to a change in the reference potential.

3. The AD converter according to claim 1, wherein the counter performs the counting operation during the first count period until the count value reaches a first predetermined value, and performs the counting operation during the second count period until the count value reaches a second predetermined value.

4. The AD converter according to claim 1, wherein the counter comprises a ripple counter.

5. The AD converter according to claim 1, wherein a high-order bit of the counter comprises a ripple counter and a low-order bit of the counter comprises a gray-code counter.

6. The AD converter according to claim 4, wherein the ripple counter comprises a toggle flipflop (TFF) and a composite OR-NAND gate,
   wherein the composite OR-NAND gate is connected to an input clock of the TFF,
   wherein the TFF is configured such that a NAND gate or a NOR gate is connected to an input of a D-flipflop (DFF), and
   wherein an output of the DFF and an initialization signal are connected to inputs of the NAND gate or the NOR gate.

7. The AD converter according to claim 1, wherein the initial value of the counter during the first count period is equal to or above $-2^{N-1}$ if the counter is an N-bit counter.

8. The AD converter according to claim 1, wherein the first count period is equal to or above (Di+1) with one clock being unit if the initial value of the counter is -Di during the first count period, and wherein Di is a natural number.

9. A solid-state imaging device, comprising:
   the AD converter according to claim 1;
   a pixel unit that includes an array of a plurality of pixels that perform photoelectric conversion;
   a ramp generator that generates the ramp waveform; and
   a clamp unit that holds the potential of the pixel signal line to a predetermined potential or higher during an auto-zero period of the comparator,
   wherein the comparator reads the potential of the pixel signal line every predetermined number of pixels.

10. The solid-state imaging device according to claim 9, wherein a clamp potential of the clamp unit is higher than the potential of the pixel signal line during the first count period and lower than a potential of a power source of the pixel unit.

11. The solid-state imaging device according to claim 9, wherein the clamp potential of the clamp unit changes in response to a gradient of the ramp waveform.

12. The solid-state imaging device according to claim 9, wherein the clamp potential of the clamp unit changes in a manner such that a potential difference between the clamp potential and the potential of a pixel during the first count period is proportional to a gradient of the ramp waveform.

13. An analog-to-digital (AD) converter converting a potential of a pixel signal line into a digital signal during each of a first count period and a second counter period in succession to the first count period, the AD converter comprising:
   a comparator that compares the potential of the pixel signal line with a reference potential that is a potential of a ramp waveform changing with time;
   a counter that stops a counting operation in response to a change in an output of the comparator; and
   an all-bit latch unit that holds all bits of a count value subsequent to stopping the counting operation during the second count period,
   wherein the counter sets an initial value for the counting operation during the first count period to be a negative value, and prior to the counting operation during the second count period, inverts all bits of the count value subsequent to stopping the counting operation during the first count period,
   wherein the counter comprises a ripple counter,
   wherein the ripple counter comprises a toggle flipflop (TFF) and a composite OR-NAND gate,
   wherein the composite OR-NAND gate is connected to an input clock of the TFF,
   wherein the TFF is configured such that a NAND gate or a NOR gate is connected to an input of a D-flipflop (DFF), and
   wherein an output of the DFF and an initialization signal are connected to inputs of the NAND gate or the NOR gate.

14. An analog-to-digital (AD) converter converting a potential of a pixel signal line into a digital signal during each of a first count period and a second counter period in succession to the first count period, the AD converter comprising:
   a comparator that compares the potential of the pixel signal line with a reference potential that is a potential of a ramp waveform changing with time;
   a counter that stops a counting operation in response to a change in an output of the comparator; and
   an all-bit latch unit that holds all bits of a count value subsequent to stopping the counting operation during the second count period,
   wherein the counter sets an initial value for the counting operation during the first count period to be a negative value, and prior to the counting operation during the second count period, inverts all bits of the count value subsequent to stopping the counting operation during the first count period, and
   wherein the first count period is equal to or above (Di+1) with one clock being unit if the initial value of the counter is $-D_i$ during the first count period, and wherein $D_i$ is a natural number.

* * * * *